(No Model.)
R. W. JONES.
VEHICLE FOR CARRYING GRAIN.
No. 479,328. Patented July 19, 1892.
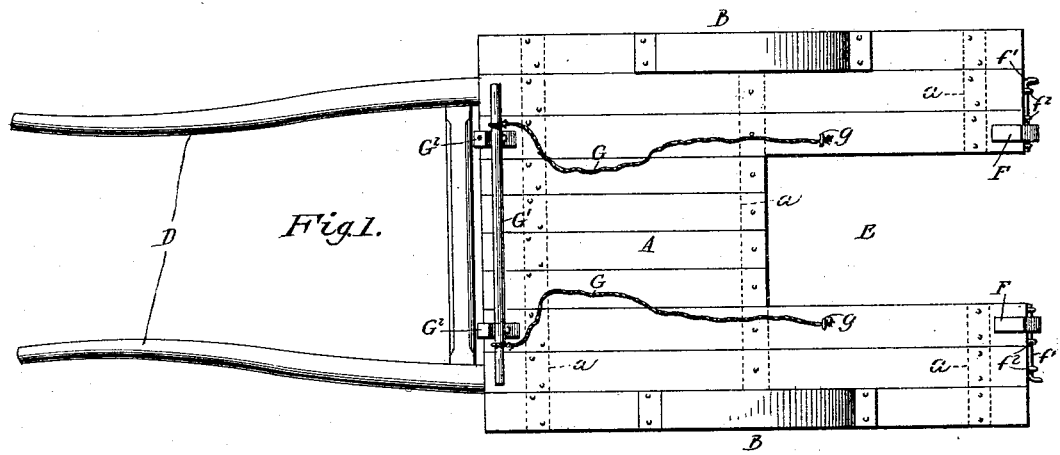
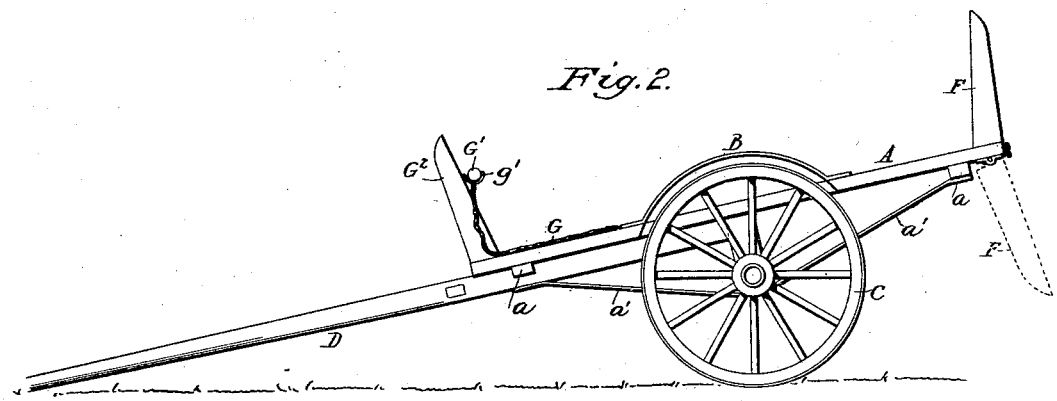
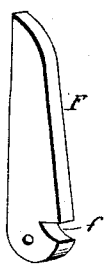
Witnesses
Inventor
Richard W. Jones,
By Bruce S. Elliott
his Attorney.

UNITED STATES PATENT OFFICE.

RICHARD W. JONES, OF ROCK HALL, MARYLAND.

VEHICLE FOR CARRYING GRAIN.

SPECIFICATION forming part of Letters Patent No. 479,328, dated July 19, 1892.

Application filed April 12, 1892. Serial No. 428,832. (No model.)

*To all whom it may concern:*

Be it known that I, RICHARD W. JONES, a citizen of the United States, residing at Rock Hall, in the county of Kent and State of Maryland, have invented certain new and useful Improvements in Vehicles for Carrying Cut Grain; and I do hereby declare the following to be a full, clear, and exact desciption of the invention, such as will enable others skilled in the art to which it appertains to make and use the same.

My invention relates to an improved vehicle for use in carrying cut corn, wheat, and the like from the field to the place of stacking, and has for its object the construction of a vehicle which may be readily loaded and unloaded from the rear by the field-hand, and of means located on said vehicle for drawing the contents thereof toward the operator when the vehicle is being unloaded.

My invention consists, broadly, in a vehicle having a flat platform provided in its rear with a cut-away portion and of two cords or ropes, each having one of its ends secured to the platform at about its center and extending to the front of the vehicle and having its other end attached to a bar, which in its normal position is seated in rests provided at the front of the platform.

My invention also has relation to a construction of tail-gates for use with my improved vehicle.

My invention further relates to the general construction and arrangement of parts, all of which will be understood more readily by reference to the accompanying sheet of drawings, in which—

Figure 1 is a plan view of my improved vehicle, showing the cords and bar in their normal position. Fig. 2 is a side view of the same, and Fig. 3 is a view in perspective of one of the tail-gates.

A designates the platform, which is flat, except as to the sides, where it is provided with guards B to prevent the contents of the vehicle from coming in contact with the wheels C. The planks of the platform are secured to cross-bars $a$, which extend underneath the platform from side to side thereof except at the rear. The vehicle is further braced by bars $a'$, extending from the front and rear, respectively, of the under side of the platform to the axle. The center cross-bar may be constructed to serve as the axle.

In the rear of the platform I provide the cut-away portion E, which may extend to about the center of the platform or, in my preferred construction, to the axle of the vehicle. This opening or recess is slightly wider than the body of a man. At the rear of the platform and on either side of the opening are located the tail-gates F. These are formed by uprights, which are pivotally secured in slots in the said platform. On their outer edges, near the bottom, they are provided with a notch or recess $f$ to receive a horizontally-movable bolt $f'$, sliding in keepers $f^2$, which are driven into the edge of the platform.

G G designate the cords or ropes for use in drawing the contents of the vehicle toward the operator, each having one of its ends secured at $g$ to the platform and its other end attached to a bar G'. At the front of the platform are provided the uprights $G^2$, which have on their inner edges hooks or rests $g'$, which normally support the said bar. The ropes are of a sufficient length to allow them to lie on the platform from the points $g$ to the base of the uprights $G^2$, when the bar is in the position shown in the drawings. In practice my dray will be about two and one-half feet in height.

The manner of using it will be readily understood. The operator, taking an armful of the corn or other grain which has been cut, enters the opening E and deposits it at the extreme front of the dray, the ropes being in the position shown. The dray is thus filled from the front back to the tail-gates, when the latter are raised and held in an upright position by sliding the bolts so that they engage with the notches $f$. It will be noticed that while the opening I provide allows ready access to the front of the dray it in no wise diminishes the carrying capacity thereof, as the grain will extend across the opening. In unloading, after the grain has been taken from the rear of the dray, the bar is lifted from the rest and drawn back, when all the grain lying on the ropes will be pulled to the rear of the platform, where it may be readily taken off.

I do not confine myself to the exact point of attachment of the ropes to the platform, as I may secure them at the extreme rear thereof or at any other convenient point.

My invention combines simplicity and efficiency in operation, and the parts being few the vehicle may be cheaply manufactured.

Having thus fully described my invention, what I claim as new, and desire to secure by Letters Patent of the United States, is—

1. A vehicle for use in carrying cut grain, having a platform flat on its upper surface and provided in its rear with a cut-away portion or opening, and means located at either end of the platform for retaining the grain in place, substantially as described.

2. A vehicle for use in carrying cut grain, having a platform flat on its upper surface and provided in its rear with a cut-away portion or opening, and means, such as described, located on the platform, whereby the contents of the vehicle may be drawn toward the operator, substantially as described.

3. In a vehicle of the class described, a device for use in unloading, comprising ropes, each having one of its ends secured to the platform of the vehicle and its other end attached to a bar, and rests provided in the front of the platform for receiving said bar, substantially as described.

4. In a vehicle of the class described, the combination of the platform having the rearward opening, tail-gates hinged to the rear portion of said platform and having the described notches therein, and the locking-bolts operating with said notches, in the manner and for the purpose set forth.

5. In a vehicle of the class described, the combination of the platform having the rearward opening, tail-gates hinged to the rear of the platform, having the notches therein as described, locking-bolts, means, such as described, for drawing the contents toward said opening, comprising two cords secured at one end to the rear portion of the platform and at their forward end to a bar, uprights on the forward end of the platform having rests for said bar, and guards on the sides of said platform to protect the contents of the vehicle from the wheels, the combination being and operating substantially as set forth.

In testimony whereof I have hereunto signed my name in the presence of two witnesses.

RICHARD W. JONES.

Witnesses:
W. S. WALKER,
CHARLES ESTES.